United States Patent [19]

Ogata et al.

[11] Patent Number: 5,321,087
[45] Date of Patent: Jun. 14, 1994

[54] PREPARATION PROCESS OF THERMOPLASTIC RESIN COMPOSITE

[75] Inventors: Naoya Ogata, Tokyo; Takehisa Nakanishi; Tadashi Asanuma, both of Takaishi, Japan

[73] Assignee: Mitsui Toatsu Chemicals, Incorporated, Tokyo, Japan

[21] Appl. No.: 916,803

[22] Filed: Jul. 22, 1992

Related U.S. Application Data

[63] Continuation of Ser. No. 486,829, Mar. 1, 1990, abandoned.

[30] Foreign Application Priority Data

Mar. 8, 1989 [JP] Japan ................................ 1-53720

[51] Int. Cl.$^5$ ........................ C08L 77/10; C08L 67/03
[52] U.S. Cl. ................................ 525/184; 525/132; 525/397; 525/400; 525/420; 525/425; 525/432; 525/437; 525/444; 525/462; 525/466; 525/467; 525/535
[58] Field of Search ............... 525/425, 184, 397, 432, 525/437, 400, 535

[56] References Cited

U.S. PATENT DOCUMENTS

| | | | |
|---|---|---|---|
| 4,228,218 | 10/1980 | Takayanagi | 525/58 |
| 4,386,186 | 5/1983 | Maresca | 525/437 |
| 4,414,365 | 11/1983 | Sugimoto | 525/437 |
| 4,810,753 | 3/1989 | Koga | 525/184 |
| 5,049,620 | 9/1991 | Hahn | 525/152 |

FOREIGN PATENT DOCUMENTS 0294062 12/1988 European Pat. Off. .
8800605 1/1988 PCT Int'l Appl. .

OTHER PUBLICATIONS

Billmeyer, Textbook of Polymer Chemistry, pp. 24–26, Wiley-Interscience, N.Y. (1971).
Toukiyou Kogyo Daigaku, Patent Abstracts of Japan, "Production of Block Copolymer", vol. 9, No. 241, Sep. 27, 1985, whole document.

*Primary Examiner*—Patricia A. Short
*Attorney, Agent, or Firm*—Burns, Doane, Swecker & Mathis

[57] ABSTRACT

The present invention relates to a process for the preparation of a thermoplastic resin composite comprising conducting polycondensation of a monomer material in a solution of an organic solvent containing an organic solvent soluble polymer to form an aromatic condensation polymer which is insoluble in said organic solvent and a thermoplastic resin composite prepared by the process.

12 Claims, No Drawings

PREPARATION PROCESS OF THERMOPLASTIC RESIN COMPOSITE

This application is a continuation of application Ser. No. 07/486,829, filed Mar. 1, 1990, abandoned.

BACKGROUND OF THE INVENTION

1. Field of the Invention

The present invention relates to a thermoplastic resin composite containing an aromatic condensation polymer and a process for preparing the thermoplastic resin composite.

More particularly, the invention relates to a thermoplastic resin composite comprising an aromatic condensation polymer including an aromatic polyester or an aromatic polyamide obtained by conducting polycondensation of the corresponding monomer materials in a solution of an organic solvent containing an organic solvent soluble high molecular weight compound, and to a process for the preparation of the thermoplastic resin composite.

2. Description of the Prior Art

Aromatic condensation polymers such as aromatic polyesters or aromatic polyamides (hereinafter referred to as rigid polymers) have been utilized as heat resistant resins for various applications.

These rigid polymers, however, generally have disadvantages such as a high softening point, insolubility in common solvents and poor processability. On the other hand, there are various resins having drawbacks in such properties as heat resistance, rigidity, dimensional stability and water absorption.

Consequently, it is important to eliminate these disadvantages and drawbacks by improving the properties of the resins and enhancing the processability of the rigid polymers. This will provide a new resin having an extended field of application.

It is difficult to fill such demand with a single resin. Yet, various kinds of blended resins have already been proposed. That is, the rigid polymer has been mixed with other species of resins to eliminate the disadvantages and to utilize the advantages of the resins in the blend.

In these proposals, the resins are blended by (1) a fusion kneading method wherein two or more of resins are physically fused and mixed by various types of kneaders, (2) a method for mixing the resins in a common solvent by previously dissolving the resins in the solvent, (3) a method for polymerizing one monomer in another resin used as a base polymer, and (4) a method for grafting one polymer on another base polymer.

However, both aromatic polyesters and aromatic polyamides are extremely rigid, have relatively high crystallinity and very high plasticizing temperatures, and hence are quite difficult to blend with other resins, particularly polymers having a low plasticizing temperature and melt viscosity. These properties lead to a serious problem in preparing the blend.

As a result of the problem, satisfactory effects cannot be expected on the improvement of physical properties of the blended resin, even though the aromatic condensation polymer is prepared by conducting polycondensation of the monomer materials without using the solvent in a polymer matrix to be blended. In other words, the method has caused a problem that severe polycondensation conditions are required for preparing the aromatic condensation polymer. Hence the matrix polymer is decomposed, or the molecular weight of the resulting aromatic condensation polymer is too low to exhibit the improved physical properties.

On the contrary, a method for conducting polymerization of a matrix polymer in a solvent capable of dissolving the aromatic condensation polymer requires a specific and expensive solvent, and almost no effect can be expected for the improvement of physical properties.

SUMMARY OF THE INVENTION

One object of the present invention is to improve the processability of an aromatic condensation polymer such as an aromatic polyester and an aromatic polyamide, without impairing the essential properties of the aromatic condensation polymer.

Another object of the present invention is to provide a thermoplastic resin composite having the excellent heat resistance of the aromatic polyester or the aromatic polyamide and improved processability, and also to provide a process for preparing the thermoplastic resin composite.

The present inventors have carried out an intensive investigation in order to solve the above problems and to prepare a thermoplastic resin composite having good properties. As a result, they have found that a thermoplastic resin composite containing an aromatic polyester or an aromatic polyamide and having excellent properties can be obtained by preparing the aromatic polyester or the aromatic polyamide through a specific process.

One aspect of this invention is a thermoplastic resin composite prepared by conducting polycondensation of monomer materials in a solution containing an organic solvent soluble polymer to form an aromatic condensation polymer which is insoluble in said organic solvent, and a process for preparing the thermoplastic resin composite.

More specifically, the present invention is a thermoplastic resin composite comprising an aromatic condensation polymer and a process for preparing the thermoplastic resin composite; said aromatic condensation polymer being an organic solvent insoluble aromatic polyester obtained by conducting, in a solution of said organic solvent containing an organic solvent soluble polymer, polycondensation of a monomer material comprised of (A) an aromatic dicarboxylic acid and aromatic diol, or (B) an aromatic, dicarboxylic acid, aromatic diol and aromatic hydroxycarboxylic acid, or (C) an aromatic hydroxycarboxylic acid in the presence of a catalyst, or (A') an aromatic dicarboxylic acid dihalide and aromatic diol in the absence of a catalyst; or said aromatic condensation polymer being an organic solvent insoluble aromatic polyamide obtained by conducting, in a solution of said organic solvent containing an organic solvent soluble polymer, polycondensation of a monomer material comprised of (D) an aromatic diamine and aromatic dicarboxylic acid, or (E) an aromatic diamine, aromatic dicarboxylic and aminocarboxylic acid, or (F) an aminocarboxylic acid in the presence of a catalyst, or (B') an aromatic diamine and an aromatic dicarboxylic acid dihalide in the absence of a catalyst.

The process of the present invention can be used to readily prepare a thermoplastic resin composite having excellent physical properties and hence is very valuable in industry.

DETAILED DESCRIPTION OF THE INVENTION

In the process of the present invention, no particular limitation is imposed upon the organic solvent soluble polymer (hereinafter referred to as soluble polymer). Any polymer can be used so long as the polymer is soluble under the reaction conditions in a solvent suitable for use in the preparation of the rigid polymer.

Such polymers include, for example, polyolefins, aromatic vinyl based polymers, polyamides, polyesters, polycarbonates, polyphenylene oxides, acetal resins and polysulfones.

Exemplary polymers are polyolefins such as polyethylene, polypropylene and ethylene-propylene copolymer; aromatic vinyl based polymers such as polystyrene, styrene-acrylonitrile copolymer and styrene-acrylonitrile-butadiene copolymer; polyamides such as nylon; polyesters such as polyethyleneglycol terephthalate and polybutyleneglycol terephthalate; polycarbonates prepared by reacting bisphenol A with phosgene; polyphenylene oxides obtained by polycondensation of o-substituted phenols such as 2,6-xylenol; acetal resins having a polyoxymethylene structure obtained by polymerizing formaldehyde; and polysulfones. Polymers having good compatibility with the rigid polymer are particularly preferred.

The concentration of the soluble polymer in the solution is usually in the range Of 0.1 to 50 % by weight. No specific limitation is placed upon the range unless it gives particular adverse effect on the operations such as solvent removal and mixing.

The below described monomers are used as raw materials for preparing the rigid polymer.

Aromatic dicarboxylic acids include, for example, dicarboxy derivatives obtained by substituting two hydrogen atoms of aromatic compounds such as benzene, naphthalene, biphenyl, diphenyl ether, diphenyl ketone and phenanthrene; and substituted-ring containing compounds wherein a portion or all of the residual hydrogen atoms on the rings of the above dicarboxy derivatives is replaced with hydrocarbon groups, alkoxy groups, nitro groups and/or halogen atoms.

Representative examples of the aromatic dicarboxylic acid which may be illustrated are dicarboxybenzene, dicarboxynaphthalene, dicarboxybiphenyl and dicarboxybenzophene.

Aromatic dicarboxylic acid dihalides are obtained by converting the carboxy groups of the above aromatic dicarboxylic acid to carbonyl halide groups. Exemplary compounds are dihaloformylbenzene, dihaloformylnaphthalene, dihaloformylbiphenyl, and dihaloformylbenzophenone.

Aromatic diols include, for example, dihydroxy derivatives obtained by substituting two hydrogen atoms of aromatic compounds such as benzene, naphthalene, biphenyl, diphenyl ether, diphenyl ketone and phenanthrene; and substituted-ring containing compounds wherein a portion or all of the residual hydrogen atoms on the rings of the above dihydroxy derivatives is replaced with hydrocarbon groups, alkoxy groups, nitro groups and/or halogen atoms.

Representative examples of the aromatic diols which may be used in the invention are dihydroxybenzene, dihydroxynaphthalene, dihydroxybiphenyl and dihydroxybenzophenone.

Aromatic diamines include, for example, diamino derivatives obtained by substituting two hydrogen atoms of aromatic compounds such as benzene, naphthalene, biphenyl, diphenyl ether, diphenyl ketone and phenanthrene; and substituted-ring containing compounds wherein a portion or all of the residual hydrogen atoms on the rings of the above diamino derivatives is replaced with hydrocarbon groups, alkoxy groups, nitro groups and/or halogen atoms.

Representative examples of the aromatic diamines which may be used in the invention are diaminobenzene, diaminonaphthalene, diaminobiphenyl and diaminobenzophenone.

Aromatic hydroxycarboxylic acids include, for example, derivatives obtained by converting two hydrogen atoms to a hydroxyl group and a carboxyl group, respectively, on the rings of aromatic compounds such as benzene, naphthalene, biphenyl, diphenyl ether, diphenyl ketone and phenanthrene; and substituted-ring containing compounds wherein a portion or all of the residual hydrogen atoms on the rings of the above derivatives is replaced with hydrocarbon groups, alkoxy groups, nitro groups and/or halogen atoms.

Representative examples of the aromatic hydroxycarboxylic acids which may be used in the invention are hydroxycarboxybenzene, hydroxycarboxynaphthalene, hydroxycarboxybiphenyl and hydroxycarboxybenzophene.

Further, aromatic aminocarboxylic acids include, for example, derivatives obtained by converting two hydrogen atoms to an amino group and a carboxyl group, respectively, on the rings of aromatic compounds such as benzene, naphthalene, biphenyl, diphenyl ether, diphenyl ketone and phenanthrene; and substitued-ring containing compounds wherein a portion or all of the residual hydrogen atoms on the rings of the above derivatives is replaced with hydrocarbon groups, alkoxy groups, nitro groups and/or halogen atoms.

Representative examples of the aromatic aminocarboxylic acids which may be used in the invention are aminocarboxybenzene, aminocarboxynaphthalene, aminocarboxybiphenyl and aminocarboxybenzophene.

The proportions of monomers is approximately 1:1 by mole in the case of the aromatic dicarboxylic acid and the aromatic diol or in the case of the aromatic dicarboxylic acid and the aromatic diamine. The aromatic hydroxycarboxylic acid or the aromatic aminocarboxylic acid can be used in an arbitrary amount. The aromatic hydroxycarboxylic acid or the aromatic aminocarboxylic acid can also be used singly.

Further, if necessary, aliphatic dicarboxylic acids, aliphatic diols, aliphatic diamines, aliphatic hydroxycarboxylic acids and aliphatic aminocarboxylic acids can also be used in combination in order to improve physical properties of the aromatic polyester or the aromatic polyamide obtained. These aliphatic compounds can be used in an amount up to about twice by mole per total mole of the aromatic dicarboxylic acid and the aromatic diol and/or the aromatic hydroxycarboxylic acid, or total moles of the aromatic dicarboxylic acid and the aromatic diamine and/or the aromatic aminocarboxylic acid. When the aliphatic compounds are used in excess of the above range, it is unfavorable because the resulting composite loses essential characteristics of the rigid polymer.

It is important in the process of this invention that the aromatic polyester or the aromatic polyamide formed by polycondensation of the above monomer materials is insoluble in the solvent under the reaction conditions.

Consequently, suitable solvents for use in the invention are aromatic hydrocarbons and halogenated hydrocarbons. The solvent which dissolves the soluble polymer for use as the matrix and does not dissolve the resulting aromatic polyester or aromatic polyamide may be selected from these organic solvents and used for the reaction.

Various kinds of catalysts which accelerate formation of an ester bond or an amide bond can be used for the process of this invention. Particularly preferred catalysts are triphenylphosphine dichloride or a mixture of triphenylphosphine or its substituted-ring containing derivatives with a polyhalogenated compound. These catalysts are often employed for efficiently forming the ester bond from hydroxyl and carboxyl groups at relatively low temperatures.

In the preparation of the aromatic polyester or the aromatic polyamide of this invention, no particular restriction is imposed upon the application conditions of triphenylphosphine dichloride, or the mixture of triphenylphosphine or its substituted-ring containing derivative with the polyhalogenated compound. The conditions which can be applied as such are disclosed for example, in the report entitled "A Preparation Method of Triphenylphosphine Dichloride and a Preparation Process of Aromatic polyester Using Triphenylphosphine Dichloride " [Journal of Polymer Science, Polymer Chemistry Edition, vol. 22, 2705(1984)], the contents of which are incorporated by reference.

It is preferred in the process of this invention that solvents such as aromatic hydrocarbons or halogenated hydrocarbons are used as at least a portion of the solvents used for the reaction and acid scavengers such as triethylamine, triphenylamine and pyridine are simultaneously used. Thus, the aromatic polyester or the aromatic polyamide can be prepared more effectively.

The reaction temperature is usually in the range of 0° to 250° C. . When the polycondensation reaction is carried out at temperatures lower than the boiling point of the solvent, the aromatic polyester or the aromatic polyamide can be formed without using particular equipment such as a pressure vessel. Generally, the reaction can sufficiently progress at room temperature.

An embodiment of the catalyst for use in the process of this invention is, for example, a derivative of triphenylphosphine dichloride from triphenylphosphine by using various chlorinating agents in the halogenated hydrocarbon solvent. Another embodiment which can be illustrated is the use of triphenylphosphine dichloride or a mixture of triphenylphosphine and the polyhalogenated compound. In the presence of these catalysts, and also with the coexistence of amines as acid scavengers, the polycondensation reaction of (A) the aromatic dicarboxylic acid and the aromatic diol, or (B) the aromatic dicarboxylic acid, the aromatic diol and the aromatic hydroxycarboxylic acid, or (C) the aromatic hydroxycarboxylic acid, or the polycondensation reaction of (D) the aromatic dicarboxylic acid and the aromatic diamine, or (E) the aromatic dicarboxylic acid, the aromatic diamine and aromatic aminocarboxylic acid, or (F) aromatic aminocarboxylic acid, is carried out to form the aromatic condensation polymer.

When the aromatic dicarboxylic acid dihalide is used in place of the aromatic dicarboxylic acid in the process of the invention, the aromatic polycondensation polymer can be readily formed in the absence of the catalyst such as triphenylphosphine dichloride. In such case, use of the aromatic dicarboxylic acid dihalide rather than the aromatic dicarboxylic acid as a monomer material can form the aromatic condensation polymer under the same reaction conditions as above in the absence of the catalyst.

As to the thermoplastic resin composite prepared by the process of the invention, no particular limitation is imposed upon the weight ratio of the soluble polymer to the aromatic condensation polymer. Preferred ratios can be selected depending upon the object for use of the resin composite. The aromatic condensation polymer is usually used in the range of 1 to 10000 parts by weight per 100 parts by weight of the soluble polymer.

For example, a relatively small amount of the soluble polymer can be used for improving the impact resistance of the aromatic polyester or the aromatic polyamide. On the other hand, a relatively small amount of the aromatic condensation polymer can be used for improving the stiffness and heat resistance of the soluble polymer.

After completing the polycondensation reaction in the process of the invention, the reaction mixture contains the soluble polymer, aromatic condensation polymer and the solvent. The solvent is then removed from the thermoplastic resin composite containing the soluble polymer and the aromatic condensation polymer. No particular restriction is put on the method for separating the solvent from the thermoplastic resin composite. The separating method which can be conducted is, for example, to remove the solvent by evaporation or to deposit the thermoplastic resin composite by the addition of a solvent in which both the soluble polymer and the aromatic condensation polymer are difficultly soluble. Molded articles of the thermoplastic resin composite having good properties can be obtained by carrying out a molding operation simultaneously in the separation step or by using the separated composite.

The present invention will hereinafter be illustrated by way of examples.

EXAMPLE 1

In a solvent mixture containing 150 ml of chloroform and 50 ml of pyridine, 14.4 g of polyarylate (Ard 100 which is the product of Amoco Co. Ltd.; polycondensation product of a 50:50 mixture of isophthalic acid dichloride and terephthalic acid dichloride with bisphenol A) was dissolved. In the solution obtained, 5.5 g of p-aminobenzoic acid and 12.6 g of triphenylphosphine were dissolved. Then a solution 14.2 g of hexachloroethane in 50 ml of chloroform was added and stirred at 25° C. for 10 hours. The resultant reaction mixture was cast into an area of 15 cm×15 cm and the solvent was removed by drying. The residual film was thoroughly washed with a 1:1 solvent mixture of methanol and acetone, and dried to obtain a composite film. Physical properties of the composite film were measured at 23° C. 100° C. and 150° C. Tensile yield strength and tensile modulus were 3.8 and 210 at 23° C., 2.5 and 130 at 100° C., and 1.45 and 110 kg/mm$^2$ at 150° C., respectivley.

COMPARATIVE EXAMPLE 1

Polyarylate was dissolved in chloroform and the resultant solution was cast as such into film. Then the same procedures as conducted in Example 1 were carried out to obtain a dried film. Tensile yield strength and tensile modulus of the dried film were 4.2 and 180 at 23° C., 2.0 and 100 at 100° C., and 0.74 and 28 kg/mm$^2$ at 150° C., respectively. Further, polycondensation of p-aminobenzoic acid was carried out in the absence of polyarylate to give polyamide. Polyarylate was dissolved in the polyamide dispersion thus obtained and cast into film by the same procedures as conducted in Example 1. Tensile yield strength and tensile modulus of the film thus obtained were 3.8 and 190 at 23° C., 2.1 and 105 at 100° C., and 0.8 and 40 kg/mm$^2$ at 150° C., respectively. Consequently, almost no reinforcing effect was found. Physical properties are inferior to the results obtained in Example 1 at high temperatures in particular.

EXAMPLE 2

The same procedures as conducted in Example 1 were carried out except that 6 g of 4-hydroxy-4'-carboxy-1,1'-biphenyl was used in place of 5.5 g of p-aminobenzoic acid. Tensile yield strength and tensile modulus of the film thus obtained were 4.3 and 220 at 23° C., 2.3 and 140 at 100° C., and 1.3 and 60 kg/mm$^2$ at 150° C., respectively.

COMPARATIVE EXAMPLE 2

The same procedures as conducted in Example 2 were carried out except that a dispersion of the aromatic polyester was prepared without dissolving polyarylate in advance and then polyarylate was dissolved in the dispersion by the same procedures as conducted in Comparative Example 1. A composite film was obtained and physical properties were measured. Tensile yield strength and tensile modulus of the film were 3.8 and 185 at 23° C., 2.2 and 100 at 100° C., and 0.75 and 35 kg/mm$^2$ at 150° C., respectively. Thus, almost no reinforcing effect was found. Physical properties are inferior to the results obtained in Example 2 at high temperatures in particular.

EXAMPLE 3

The same procedures as conducted in Example 1 were carried out except that 5.5 g of hydroquinone and 8.95 g of terephthalic acid dichloride were used in place of 5.5 g of p-aminobenzoic acid and without using triphenylphosphine and hexachloroethane. Physical properties of the composite film obtained were measured. Tensile yield strength and tensile modulus were 4.1 and 220 at 23° C., 2.1 and 60 at 160° C., and 1.4 and 120 kg/mm$^2$ at 150° C., respectively.

COMPARATIVE EXAMPLE 3

The same procedures as conducted in Example 3 were carried out except that a dispersion of the aromatic polyester was prepared without dissolving polyarylate in advance and then polyarylate was dissolved in the dispersion by the same procedures as conducted in Comparative Example 1. A composite film was obtained and physical properties were measured. Tensile yield strength and tensile modulus of the film were 3.8 and 185 at 23° C., 2.2 and 100 at 100° C., and 0.75 and 35 kg/mm$^2$ at 150° C., respectively. Thus, almost no reinforcing effect was found. Physical properties are inferior to the results obtained in Example 3 at high temperatures in particular.

EXAMPLE 4

The same procedures as conducted in Example 2 were carried out except that polycarbonate (Panlite ; a product of Teijin Kasei Co. Ltd.) was used in place of polyarylate. A composite film was obtained and physical properties were measured. Tensile yield strength and tensile modulus were 4.3 and 210 at 23° C., 3.1 and 198 at 100° C., and 2.3 and 89 kg/mm$^2$ at 150° C., respectively.

COMPARATIVE EXAMPLE 4

Polycarbonate used in Example 4 was dissolved in chloroform and the resultant solution was cast into film by the same procedures as conducted in Comparative Example 1. Tensile yield strength and tensile modulus of the film thus obtained were 4.0 and 140 at 23° C., 2.4 and 89 at 100° C., and 1.0 and 30 kg/mm$^2$ at 150° C.

Separately, the same procedures as conducted in Comparative Example 2 were carried out except that polycarbonate of Example 4 was used in place of polyarylate. A composite film was obtained and physical properties were measured. Tensile yield strength and tensile modulus of the film were 4.0 and 150 at 23° C., 2.5 and 120 at 100° C. , and 1.5 and 60 kg/mm$^2$ at 150° C., respectively. Physical properties are inferior to the results obtained in Example 4 at high temperatures in particular, and the reinforcing effect is also samll.

EXAMPLE 5

The same procedures as conducted in Example 4 were carried out except that polyoxymethylene 40 (a product of Mitsubishi Gas Chemical Co. Ltd.) was used in place of polycarbonate. Solvent was evaporated from the reaction mixture and the residue was pressed to obtain a composite sheet.

Tensile yield strength and tensile modulus of the sheet were 4.3 and 205 at 23° C., 3.2 and 199 at 100° C., and 2.5 and 95 kg/mm$^2$ at 150° C., respectively.

COMPARATIVE EXAMPLE 5

The slurry of aromatic polyester obtained in Comparative Example 4 was filtered. The aromatic polyester thus obtained was mixed with polycarbonate, kneaded at 300° C. and pressed to form a composite sheet. Separately, as a reference, polycarbonate alone was pressed into a sheet without addition of the polyester. Physical properties of both sheets were measured. Tensile yield strength and tensile modulus of the polycarbonate sheet were 4.2 and 145 at 23° C., 2.5 and 92 at 100° C., and 1.4 and 36 kg/mm$^2$ at 150° C., respectively. Those of the composite sheet were 4.3 and 165 at 23° C., 3.0 and 105 at 100° C., and 1.5 and 55 kg/mm$^2$ at 150° C., respectively. Thus, the reinforcing effect was small.

EXAMPLE 6

The same procedures as conducted in Example 1 were carried out except that 3.0 g of hydroquinone and 4.0 g of terephthalic acid were used in place of 5.5 g of p-aminobenzoic acid. Tensile yield strength and tensile modulus of the composite film thus obtained were 4.3 and 240 at 23° C., 2.5 and 180 at 100° C., and 1.5 and 130 kg/mm$^2$ at 150° C. , respectively.

COMPARATIVE EXAMPLE 6

The same procedures as conducted in Comparative Example 1 were carried out except that polyoxymethylene of Example 5 was used in place of polyarylate.

Tensile yield strength and tensile modulus of polyoxymethylene film thus obtained were 4.1 and 150 at 23° C., 2.7 and 110 at 100° C., and 1.6 and 45 kg/mm$^2$ at 150° C., respectively. Those of the composite film were 4.2 and 165 at 23° C., 2.5 and 120 at 100° C., and 1.5 and 60 kg/mm$^2$ at 150° C., respectively. Thus, physical properties are inferior to the results obtained in Example 5 at high temperatures in particular and the reinforcing effect is also small.

EXAMPLE 7

The same procedures as conducted in Example 6 were carried out except that 3.1 g of p-phenylenediamine was used in place of 3.0 g of hydroquinone. Tensile yield strength and tensile modulus of the composite film thus obtained were 4.4 and 235 at 23° C., 2.6 and 195 at 100° C., and 1.8 and 125 kg/mm² at 150° C., respectively.

COMPARATIVE EXAMPLE 7

A dispersion of aromatic polyamide was prepared by using the same raw materials as used in Example 7 without dissolving polyarylate in advance and then polyarylate was added to the dispersion as conducted in Comparative Example 1. Thereafter the same procedures as conducted in Example 7 were carried out to obtain a composite film. Tensile yield strength and tensile modulus of the composite film were 4.0 and 195 at 23° C., 2.2 and 110 at 100° C., and 0.95 and 32 kg/mm² at 150° C., respectively. Thus, almost no reinforcing effect was found and physical properties are inferior to the results obtained in Example 7 at high temperatures in particular.

EXAMPLE 8

The same procedures as conducted in Example 6 were carried out except that 1 g of p-hydroxybenzoic acid was further added in the reaction. Tensile yield strength and tensile modulus of the composite film thus obtained were 4.1 and 240 at 23° C., 2.6 and 180 at 100° C., and 1.6 and 120 kg/mm² at 150° C., respectively.

EXAMPLE 9

The same procedures as conducted in Example 7 were carried out except that 1 g of p-aminobenzoic acid was further added in the reaction. Tensile yield strength and tensile modulus of the composite film thus obtained were 4.2 and 235 at 23° C., 2.7 and 185 at 100° C., and 1.8 and 115 kg/mm² at 150° C., respectively.

What is claimed is:

1. A process for the preparation of a thermoplastic resin composite comprising (i) polycondensing a monomer material in a solution of an organic solvent containing an organic solvent soluble polymer which is soluble in said organic solvent under polycondensation reaction conditions, and (ii) forming an aromatic condensation polymer which is insoluble in said organic solvent, said aromatic condensation polymer being an polyester or aromatic polyamide and being insoluble in said organic solvent under polycondensation reaction conditions.

2. A process for the preparation of a thermoplastic resin composite of an organic solvent insoluble aromatic polyamide, said process comprising polycondensing a monomer material in a solution of an organic solvent and a polymer, said polymer being soluble in said organic solvent under polycondensation reaction conditions, and in the presence of a catalyst, said monomer material comprising (D) an aromatic diamine and aromatic dicarboxylic acid, or (E) an aromatic diamine, aromatic dicarboxylic acid and aminocarboxylic acid, or (F) an aminocarboxylic acid, wherein said aromatic polyamide is insoluble in said organic solvent under polycondensation reaction conditions.

3. A process according to claim 2, wherein polycondensation is carried out at a temperature ranging from 0° to 250° C.

4. A process for the preparation of a thermoplastic resin composite of an organic solvent insoluble aromatic polyamide, said process comprising polycondensing a monomer material in a solution of an organic solvent and a polymer, said polymer being soluble in said organic solvent under polycondensation reaction conditions, and in the absence of a catalyst, said monomer material comprising (B') an aromatic dicarboxylic acid dihalide and an aromatic diamine, wherein said aromatic polyamide is insoluble in said organic solvent under polycondensation reaction conditions.

5. The process of claim 1, 2 or 4, wherein the solvent is halogenated hydrocarbon or aromatic hydrocarbon.

6. The process of claim 2 wherein the catalyst is triphenolphosphine dichloride or its derivative containing substituted aromatic ring, or a mixture of triphenylphosphine or its derivative containing substituted aromatic ring and polyhalogenated compound.

7. The process of claim 2 wherein the solvent is halogenated hydrocarbon or aromatic hydrocarbon, and the catalyst is triphenylphosphine dichloride or its derivative containing substituted aromatic ring, or a mixture of triphenylphosphine or its derivative containing substituted aromatic ring and a polyhalogenated compound.

8. The process of claim 2 or 4, wherein the polycondensation is conducted in the presence of an acid scavenger.

9. A process for the preparation of a thermoplastic resin composite comprising (i) polycondensing a monomer material in a solution soluble polymer which is soluble in said organic solvent under polycondensation reaction conditions, and (ii) forming an aromatic condensation polymer which is insoluble in said organic solvent, said aromatic condensation polymer being an aromatic polyamide and characterized by being insoluble in a solvent mixture of 150 ml chloroform and 50 ml pyridine under polycondensation reaction conditions.

10. A process for the preparation of a thermoplastic resin composite comprising (i) selecting a combination of a polymer and an organic solvent such that the selected polymer will be soluble in the selected organic solvent under polycondensation reaction conditions; (ii) selecting a monomer material to be polycondensed to an aromatic condensation polymer which is insoluble in the selected organic solvent under polycondensation reaction conditions; (iii) polycondensing the monomer material in a solution of the selected organic solvent containing the selected organic solvent soluble polymer which is soluble in said organic solvent under polycondensation reaction conditions; and (iv) forming the aromatic condensation polymer which is insoluble in said organic solvent, said aromatic condensation polymer being an aromatic polyamide and being insoluble in said organic solvent under polycondensation reaction conditions.

11. A process according to claim 10, wherein polycondensation is carried out at a temperature ranging from 0° to 250° C.

12. A process for the preparation of a thermoplastic resin composite of an organic solvent insoluble aromatic polyamide, said process comprising polycondensing a monomer material in a solution of an organic solvent and a polymer, said polymer being soluble in said organic solvent under polycondensation reaction conditions, and in the presence of a catalyst, said monomer material comprising (F) an aminocarboxylic acid, wherein said aromatic polyamide is insoluble in said organic solvent under polycondensation reaction conditions.

* * * * *

UNITED STATES PATENT AND TRADEMARK OFFICE
CERTIFICATE OF CORRECTION

PATENT NO. : 5,321,087

DATED: : June 14, 1994

INVENTOR(S) : Naoya OGATA et al

It is certified that error appears in the above-identified patent and that said Letters Patent is hereby corrected as shown below:

Claim 1, column 9, line 50, delete "polyester or".

Claim 9, column 10, line 30, after "solution", insert --of an organic solvent containing an organic solvent--.

Signed and Sealed this

Twenty-second Day of August, 1995

Attest:

BRUCE LEHMAN

Attesting Officer

Commissioner of Patents and Trademarks